Sept. 14, 1965 G. C. PARSONS ETAL 3,205,697
TEST TURNTABLE FOR INERTIAL GUIDANCE DEVICES
Filed Dec. 19, 1961
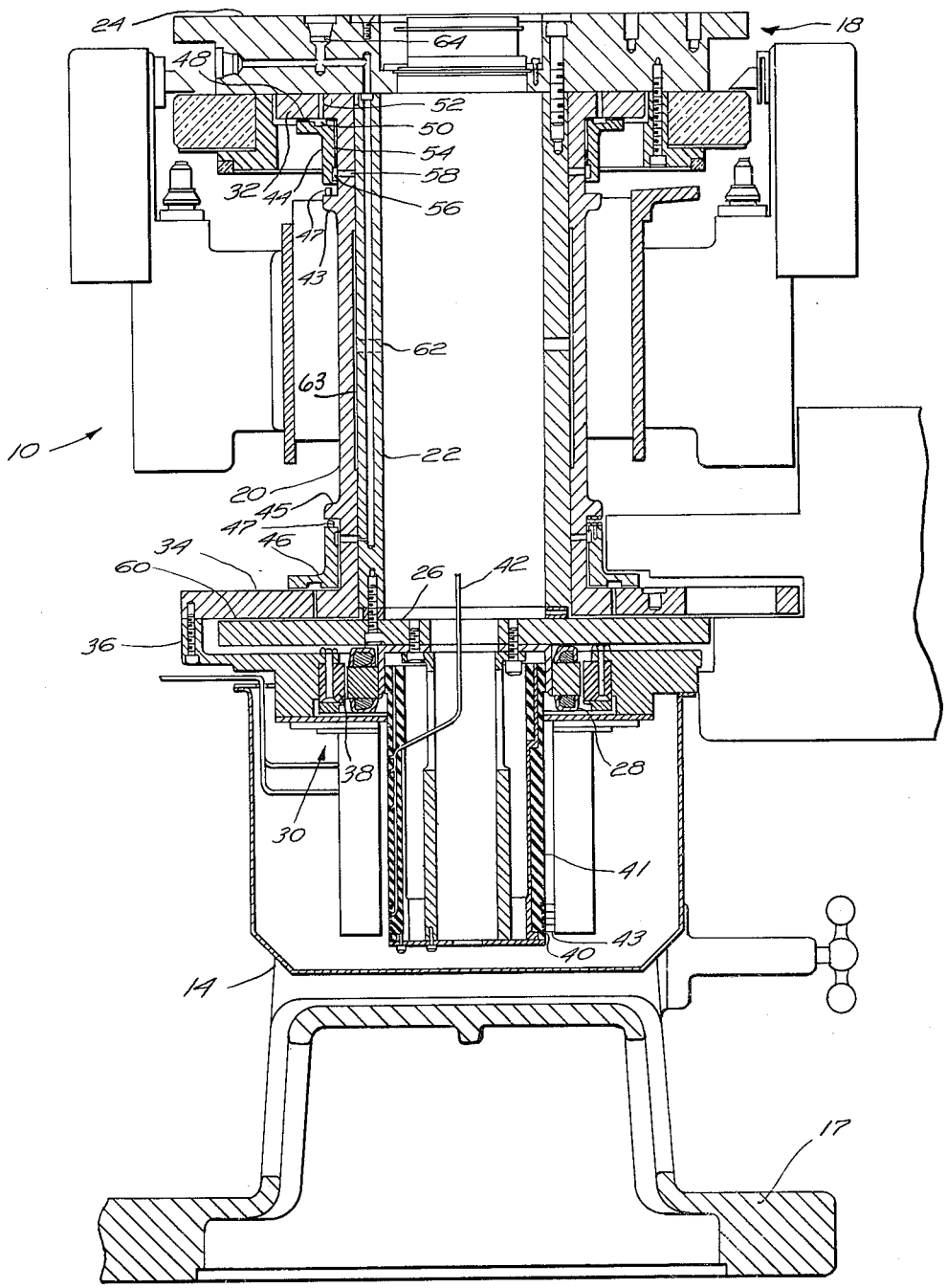
INVENTORS
GODDARD C. PARSONS
ROBERT D. LEROY
BY
*Morse & Altman*
ATTORNEYS

United States Patent Office 3,205,697
Patented Sept. 14, 1965

3,205,697
TEST TURNTABLE FOR INERTIAL
GUIDANCE DEVICES
Goddard C. Parsons, Wayland, and Robert D. LeRoy, Brookline, Mass., assignors, by mesne assignments, to Wayne-George Corporation, Newton, Mass., a corporation of Massachusetts
Filed Dec. 19, 1961, Ser. No. 160,517
1 Claim. (Cl. 73—1)

This invention relates in general to turntables for testing inertial guidance devices and more particularly concerns a high performance, rotary test turntable in which a film of pressurized gas is employed to support the test platform for substantially frictionless movement.

With the development of high precision gyros there has grown an accompanying need for test instruments capable of measuring minute, non-compensatable residual drift rates. Residual drift rate is the prime measure of gyro quality and as such, depends directly upon the degree to which the effects of gimbal friction and mass unbalance can be eliminated. Gimbal friction as a factor in gyro drift has been substantially reduced by the introduction of the floated rate-integrating gyro with the result that gyro performance has been substantially improved. As further advances in design and manufacturing techniques were made, gyro drift rates were reduced to a level which conventional test tables were unable to detect. Quite clearly, in order to evaluate the performance of a gyro, the test equipment should perform at least an order of magnitude better than that of the test specimen.

In testing inertial guidance devices, the test piece is mounted on the turntable which is slaved to it by means of a closed loop servo system. It follows then that the accuracy by which the table follows the gyro is dependent upon the quality or performance characteristics of the table itself.

One of the most significant factors which affects the performance of the turntable is friction inherent in the axis support bearings. Originally, test tables for inertial guidance devices employed conventional ball or roller bearings to rotatably support the test platform. Although turntables fitted with bearings of this type are capable of measuring drift rates of 0.1°/hr., inertial grade gyros are now being produced which have drift rates of 0.001°/hr. and below. Because of the introduction of noise into the servo loop by reason of variations in frictional torque, mechanical bearings are unsuitable for testing low drift rate gyros.

In order to improve turntable performance pressurized oil bearings have been substituted for mechanical bearings with the result that the test platform is precisely supported and rotates with a low level of friction. However, despite improved performance provided by the pressurized oil bearings, the capabilities of the turntable fail to meet the standards required to evaluate properly the performance of many modern, high precision gyros. Viscous drag developed by the oil as well as the random effects on bearing behavior, occasioned by variations in ambient temperature, combine to impair the sensitivity of the test equipment. Also pressurized oil bearings present an annoying leakage problem and require relatively complicated filtering systems to maintain the lubricant in a clean condition.

Accordingly, it is a general object of the present invention to provide an improved test turntable for evaluating inertial guidance devices.

A more particular object of this invention is to provide a test turntable for inertial guidance devices in which the rotating test platform is substantially free from torques caused by non-uniform momentum forces.

Another object of this invention is to reduce viscous drag forces in gyro test turntables.

Yet another object of this invention is to provide a gyro test turntable that is generally insensitive to variations in ambient temperatures.

Still another object of this invention is to provide in a gyro test turntable a rotating test platform that is mechanically isolated from its supporting base.

More particularly this invention features a test turntable for inertial guidance devices in which the test platform is rotatably mounted on a supporting frame by means of pressurized gas bearings.

As another feature of this invention, inherently compensated gas bearings are utilized to provide a thin supporting gas film free from recesses, pockets or grooves between the fixed and rotating members thereby providing a dynamically stable well-damped test platform.

But these and other features of the invention, along with further objects and advantages thereof, will become more readily apparent from the following detailed description taken in connection with the accompanying drawings in which:

The drawing is a sectional view in front elevation of a gyro test turntable made according to the invention.

Referring now to the drawings, reference character 10 generally indicates a test turntable for inertial guidance devices and includes a base 17 having an integral bifurcated yoke 14 and mounted on a sub base (not shown) for rotation about a vertical axis. Rotatably mounted in bearings located at the extremities of the yoke are coaxial trunnions (not shown) which support a test platform 18 for angular adjustment about a horizontal axis which perpendicularly intersects the longitudinal axis of platform 18 at a point intermediate the ends of cylinder 20.

The test platform comprises the tubular flanged cylinder 20 in which a concentric tubular shaft 22 is rotatably mounted. Fixed to the upper end of the shaft 22 is a flat circular plate 24 on which the test specimen is mounted. A flat circular plate 26 is also secured to the lower end of the shaft and carries field windings 28 for a D.C. torque motor 30.

The cylinder 20 is fabricated with an upper annular flange 32 arranged in spaced facing relation to the upper plate 24 and a lower annular flange 34 arranged in spaced facing relation to the lower plate 26. An annular bracket 36 depends from the periphery of the lower flange 34 and carries an annular, permanent magnet, stator piece 38 for the torque motor 30. An array of slip rings 40 are mounted on a cylindrical tube 41 of electrically insulating material and mating brushes 43, which connect with leads 42 respectively are provided whereby signals generated by the test gyro may be transmitted to remote electrical measuring equipment.

Mounted about the outer periphery of the cylinder 20, one below the flange 32 and one above the flange 34, are a pair of annular manifolds 44 and 46. Annular shoulders 43 and 45 are formed circumferentially about the cylinder 20 and carry a number of bolts 47 and which bear against the manifolds for clamping them in position snugly against their respective plates. Each manifold preferably is fabricated in two sections of 180° each for convenience in assembling and servicing. As shown, each manifold has a flat circular surface 48 for mounting flush against one of the flanges 32 and 34 and is formed with a concentric groove 50 which delivers a flow of pressurized gas into an array of passages 52 extending through the flanges 32 and 34. The manifolds are also formed with cylindrical inner surfaces 54 having an inwardly facing groove 56 for delivering a flow of pressurized gas to an array of passages 58 extending radially through the cylinder 20. Both manifolds are connected to a source of pressurized gas maintained at a constant pressure of 90 p.s.i.g., for example.

As viewed in the drawing, the passages 52 communicate with a thin annular space 60 formed between the flanges 32 and 34 and the plates 24 and 26. The passages 58, in turn, communicate with the tubular space formed between the cylinder 20 and the shaft 22. The clearance between opposing surfaces is sufficient for the formation of a film of gas maintained at pressure sufficient to support the assembly of the shaft 22 and its plates 24 and 26 for substantially frictionless rotation about its longitudinal axis.

A continuous flow of pressurized gas is delivered between the bearing surfaces and exhausted to the atmosphere. In the case of the upper and lower portions of the assembly between the plates and the flanges, the gas is exhausted radially outward as for example at 60. With respect to the gas film formed between the cylinder and the shaft, the flow is axial into a shallow annular recess 63 formed about the shaft 22 and then out through one of several ports 62 formed radially through the center of the shaft.

A passage 64 extends through the shaft and plate 24 to connect at its upper end with a pressure gauge (not shown) and at its lower section to branch into communication with the annular space between the shaft and the cylinder.

In a preferred embodiment of this invention, the gas film bearings are inherently compensated and do not use pockets or recesses about the gas inlet orifices. In an inherently compensated hydrostatic bearing, a fluid film separates the shaft and journal and is maintained by a source of pressurized fluid external to the bearing. The pressure within this fluid is compensated so as to resist deflection of the shaft. In a pool-type hydrostatic bearing, this regulation is accomplished by external flow restrictions whereas in the inherently compensated gas bearing no external compensating flow restrictions are present and the gas is introduced directly into the clearance through straight-drilled holes. It has been found that gas bearings which use recesses to create constant pressure pockets tend to increase the load carrying capacity of the bearing, but, at the same time, self oscillate or flutter except under certain restrictive conditions. However, in an inherently compensated gas bearing, no recesses are used and the bearing is basically stable. It has high stiffness and high relative stability; it is positively damped and not susceptible to air hammer as might be the case in other types.

Configuration is similar to a conventional sleeve type journal bearing with a thin film of air separating the fixed and rotating parts. The gas film is maintained by supplying air through passages so spaced and of such size as to provide a flow to the bearing gap.

Because of the film of gas separating the movable and fixed bearing surfaces, there is no stiction and viscous drag is negligible. The surfaces are kept clean or purged by virtue of continual gas flow through the bearing, which gas may be either air supplied from an ordinary shop air line (80–120 p.s.i.) or dry nitrogen from a high pressure compressed gas cylinder. The elimination of wow and flutter due to frictional uncertainties in conventional bearings allows smooth and continuous rotation of the table over the entire rate range making it ideally suited for evaluating low threshold, high accuracy rate gyros.

While the invention has been described with particular reference to the illustrated embodiment, it will be understood that numerous modifications will appear to those skilled in the art without departing from the invention.

Having thus described our invention, what we claim and desire to obtain by Letters Patent of the United States is:

In a table for supporting inertial guidance devices during testing, the combination comprising, a tubular journal, an outwardly flared flat radial flange formed at each end of said journal, gimballing means supporting said journal for movement about vertical and horizontal axes, a rotor coaxially mounted within said journal for rotation about its longitudinal axis, a flat annular plate secured to each end of said rotor, said plates and said rotor defining a clearance of generally constant depth between said journal and said flanges, one of said plates being adapted to support an inertial guidance device thereon, plate and rotor rotating means responsive to signals from said inertial guidance device for rotating said rotor and said plates, said journal and said flanges each including a plurality of unrestricted straight drilled passages communicating with said clearance between said journal and said flanges, each of said passages terminating in an orifice flush with the journal and flange inner surface whereby pressurized gas delivered into said passages will undergo but a single pressure drop at each orifice to form a thin gas film within said clearance, means for delivering gas into said passages and means for exhausting said gas.

References Cited by the Examiner

UNITED STATES PATENTS

| | | | |
|---|---|---|---|
| 2,470,773 | 5/49 | Haskins | 73—1 |
| 2,490,574 | 12/49 | Austin | 73—1 |
| 2,862,385 | 12/58 | Woods. | |
| 2,885,915 | 5/59 | Schurger | 308—9 X |
| 3,026,150 | 3/62 | Buckley | 308—9 |
| 3,030,744 | 4/62 | Mueller | 308 |
| 3,034,837 | 5/62 | Barker | 308 |

OTHER REFERENCES

"Air Lubricated Bearings" by P. M. Mueller, an article from Product Engineering 1953 Annual Handbook, pages J2–J5.

ISAAC LISANN, *Primary Examiner.*